United States Patent [19]

Onoda et al.

[11] Patent Number: 4,997,728
[45] Date of Patent: Mar. 5, 1991

[54] STRUCTURE FOR INCORPORATING FUEL CELL

[75] Inventors: Yoshitomi Onoda, No. 13-4, Iwakubo-cho; Masahiro Watanabe, No. 2-10, Kitashim 1-chome, both of Kofu-shi, Yamanashi, Japan

[73] Assignees: Tanaka Kikinzoku Kogyo K.K.; Yoshitomi Onoda; Masahiro Watanable, all of Japan

[21] Appl. No.: 491,335

[22] Filed: Mar. 9, 1990

[51] Int. Cl.$^5$ .............................................. H01M 2/00
[52] U.S. Cl. ........................................ 429/34; 429/37
[58] Field of Search ............................ 429/12, 34, 37

[56] References Cited

U.S. PATENT DOCUMENTS

| 4,345,009 | 8/1982 | Fahle et al. | 429/37 |
| 4,430,390 | 2/1984 | Fekete | 429/34 |
| 4,615,107 | 10/1986 | Kumeta et al. | 429/12 |
| 4,692,391 | 9/1987 | Hirota | 429/34 |

Primary Examiner—Anthony Skapars
Attorney, Agent, or Firm—Klauber & Jackson

[57] ABSTRACT

Disclosed herein is a structure for incorporating a fuel cell comprising a plurality of layers of unit cells which constitute a fuel cell which are elastically stacked between a fastening member and a base plate, the substantially entire surface of at least one of the end layers being pressed by the surface of a pressing jig wherein the other portion of the jig is rotatably engaged with the surface of the fastening member.

Also disclosed is a structure for incorporating a fuel cell comprising a plurality of layers of unit cells which constitute a fuel cell and are alternately stacked with partition plates placed on a base plate; a pressing jig having a spherical projection on the upper central portion placed on the stacked layers; and a fastening member having at its lower central portion a rounded concave engaged with the spherical projection of the pressing jig; the piled cells being fastened by means of bolts and nuts at the four corners of the fastening member and at the four corners of the base plate, and the nuts screwed to the bolts through pressing springs placed between the nuts and the upper surface of the fastening plate.

According to the structures of the present invention, the unit cells of the fuel cells can be held together with constant adherence even if uneven external forces are applied to the structure because of the presence of the rotatable upper portion or of the spherical projection of the jig whereby the air-tightness and the output can be maintained constant.

2 Claims, 2 Drawing Sheets

STRUCTURE FOR INCORPORATING FUEL CELL

BACKGROUND OF INVENTION

This invention relates to a structure for incorporating a fuel cell.

As shown in FIG. 1, a unit cell 8 constituting a fuel cell consists of a pair of gas diffusion electrodes 2, an electrolyte matrix 1 held between the electrodes 2, a carbon plate 5 having a parallel fuel (hydrogen) passages 4 at regular intervals on the upper surface off the upper electrode 2, and a carbon plate 7 having parallel air (oxygen) passages 6 at regular intervals on the lower surface of the lower electrode 2, the respective passages 4, 6 being crossed at right angles. When the fuel cell is made up by such unit cells 8, many layers of the unit cells 8 are alternately stacked with partition plates 9 and fixed on a base plate 11 which is fixed on two bars 12 diagonally crossed as shown in FIG. 2. Compression pads 14 equipped to upper bars 13 and diagonally crossed are put on the pressing plate 10 so that the cell layers 8 and the partition plates 9 are fastened by bolts 15 and nuts 16 at the ends of the upper and lower die bars 13, 12.

In the above structure incorporating the fuel cell fastened by the bolts 15 and the nuts 16 at the ends of the upper and lower die bars 13, 12, it is quite difficult to uniformly compress the entire surface by the four-point fastening by means of the compression pads. When the bolts 15 are expanded due to temperature rise, the cells 8 become loose and the air-tightness of the fuel (hydrogen) passages 4 and the air (oxygen) passages 6 is damaged, and an unevenness of the contact resistance is generated, resulting in a lowering of the output.

SUMMARY OF INVENTION

It is an object of the present invention to provide a structure for a fuel cell in which a plurality of layers of stacked unit cells constitute a fuel cell.

It is another object of the invention to provide a structure for incorporating a fuel cell in which all the unit cells are uniformly pressed to one another which do not allow the cells to loosen even if an element of the structure is expanded due to, for example, temperature rise.

It is a further object of the invention to provide a structure for incorporating a fuel cell which ensures air-tightness of passages for the fuel and an oxygen containing gas.

It is a still further object of the invention to provide a structure for incorporating a fuel cell which maintains a substantially constant output.

One aspect of this invention is a structure for incorporating a fuel cell comprising a plurality of layers of unit cells which constitute a fuel cell and are elastically stacked between a fastening member and a base plate, the substantially entire surface of at least one of the end layers being pressed by the surface of a pressing jig of which the other portion is rotatably engaged with the surface of the fastening member.

Another aspect of the invention is a structure for incorporating a fuel cell comprising a plurality of layers of unit cells which constitute a fuel cell and are alternately stacked with partition plates placed on a base plate; a pressing jig having a spherical projection on its upper central portion placed on the stacked layers; and a fastening member having at its lower central concave a rounded concave engaged with the spherical projection of the pressing jig; the stacked unit cells being fastened by means of bolts and nuts at the four corners of the fastening member and at the four corners of the base plate, and the nuts screwed to the bolts through pressing springs placed between the nuts and the upper surface of the fastening member.

Since substantially the entire surface of the stacked layers of the unit cells in the first aspect of the invention is elastically pressed, the unevenness of the fastening forces, even if it occurs, can be absorbed so that a constant fastening of the unit cells can be attained to ensure a constant air-tightness and a constant output.

Since the stacked layers of the unit cells in the second aspect of the invention are tied up by fastening the unit cells by means of the fastening member having at its lower central portion a rounded concave portion and through the pressing jig having a spherical projection on the upper central portion, the entire fastening force of the fastening member is concentrated to the pressing jig through the rounded projection at the center of its upper portion, even if the fastening torques of the bolts and the nuts at the four corners fastening the fastening member differ some or less from each other. Therefore, the entire surface of the upper surface of the unit cells is pressed by the press jig with a uniform surface pressure so that the unevenness can be diminished. Even when the bolts are expanded due to a temperature rise, the cells are not loosened because the pressing jig is pressed by means of the pressing springs. Accordingly, the air-tightness of the fuel (hydrogen) passages and of the air (oxygen) passages is never damaged, and the output it not lowered because the contact resistance does not increase.

DETAILED DESCRIPTION OF INVENTION

The present invention contemplates a structure incorporating a fuel cell therein which ensures the air-tightness of the fuel and air passages and maintains a high output.

Figure 1:
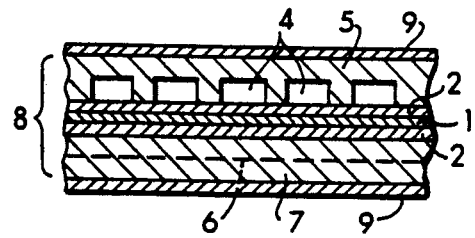
FIG. 1 is an enlarged longitudinal sectional view of a cell constituting a fuel cell.
Figure 2:
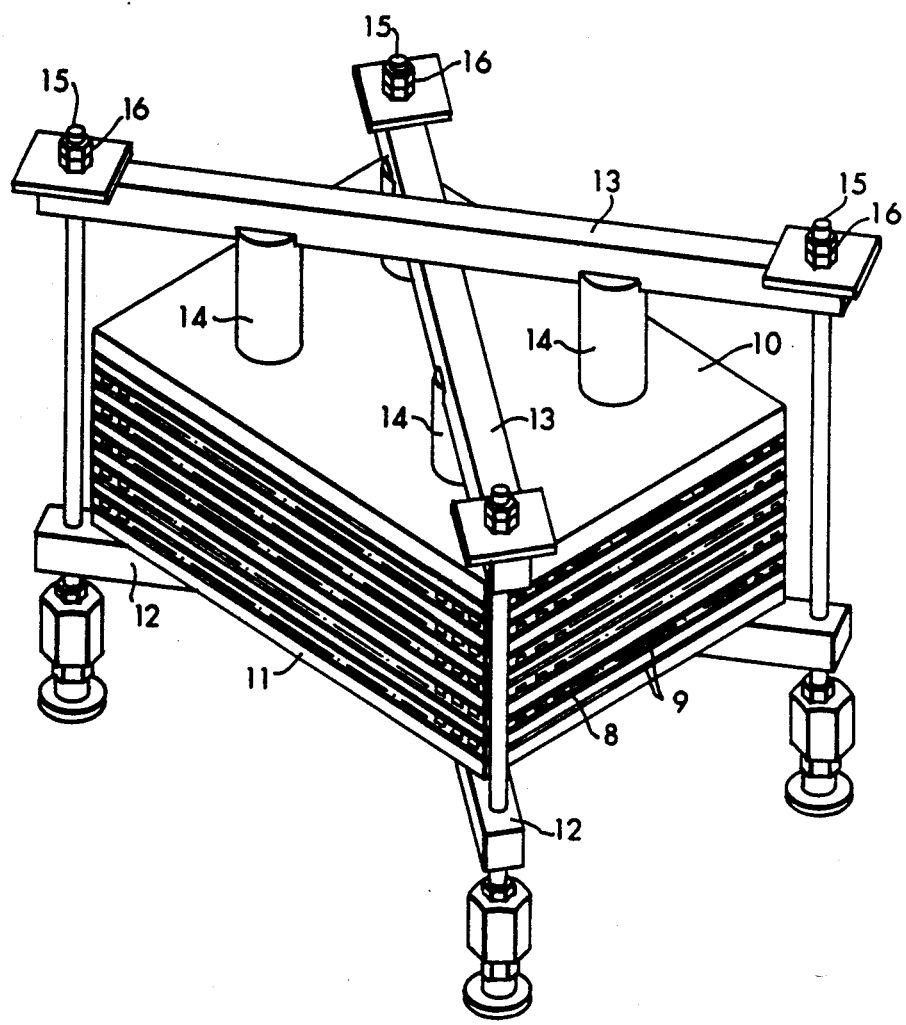
FIG. 2 is a perspective view showing a conventional structure incorporating a fuel cell.

As shown in FIG. 1, the components of the fuel cell themselves may be the same as those used in a conventional cell.

The basic structure of the invention is formed by a plurality of unit cells elastically placed between a fastening member and a base plate, and the substantially entire surface or surfaces of at least one of the end layers of the unit cells is pressed downwardly or upwardly by the surface or surfaces of a pressing jig or jigs of which the other portion or portions are rotatably engaged with the surface or surfaces of the fastening member or members.

Although the four corners of the fastening member and those of the base plate can be preferably connected by four pairs of bolts and nuts, any other connecting means can be employed so long as the unit cells may be elastically positioned between the fastening member and the base plate. A means for providing elasticity is desirably a spring which may be placed between the pressing jig and the fastening member or between the nut and the fastening member.

In order to absorb the possible uneven external forces, a pressing jig is employed in the present invention. Although the pressing jig may be positioned on one end layer of the unit cells or two pieces of the jigs may be positioned on both end layers of the unit cells, one pressing jig is preferably positioned on the upper end layer of the unit cells.

In this preferred structure, the lower surface of the jig is in contact with the substantially entire upper surface of the unit cells, and the upper portion thereof is rotatably engaged with the lower surface of the fastening member. A particulary preferable engaging structure between the fastening member and the jig is one where at the upper portion of the jig is formed a spherical projection which is rotatably engaged with a rounded concave formed on the central lower surface of the fastening member. However, any other rotatably engaging structure between a jig and a fastening member can be employed. For example, a steel ball may be rotatably placed between two round concaves formed on the respective central portions of the jig and the fastening member.

The shape of the jig may be so designed that the external force from the fastening member is transmitted from the central portion contacting the fastening member to the other entire surface of the jig. The said jig may be solid or hollow, and the preferable shape is pyramidal.

The shape of the fastening member is not particularly restricted so long as the fastening member can be rotatably in contact with the jig, and for example, two crossed bars which are in contact with the jig at the crossed point can be employed.

In the structure thus described, when uneven external forces are applied, in other words, when the fastening member is inclined, the forces are transmitted at first to the upper portion or to the spherical projection of the jig at which point the uneven forces are concentrated and from which it uniformly scatters to the entire upper surface of unit cells so that the air-tightness and the output can be maintained constant. When the two jigs are employed, the unevenness can be diminished following the same mechanism.

Figure 3:
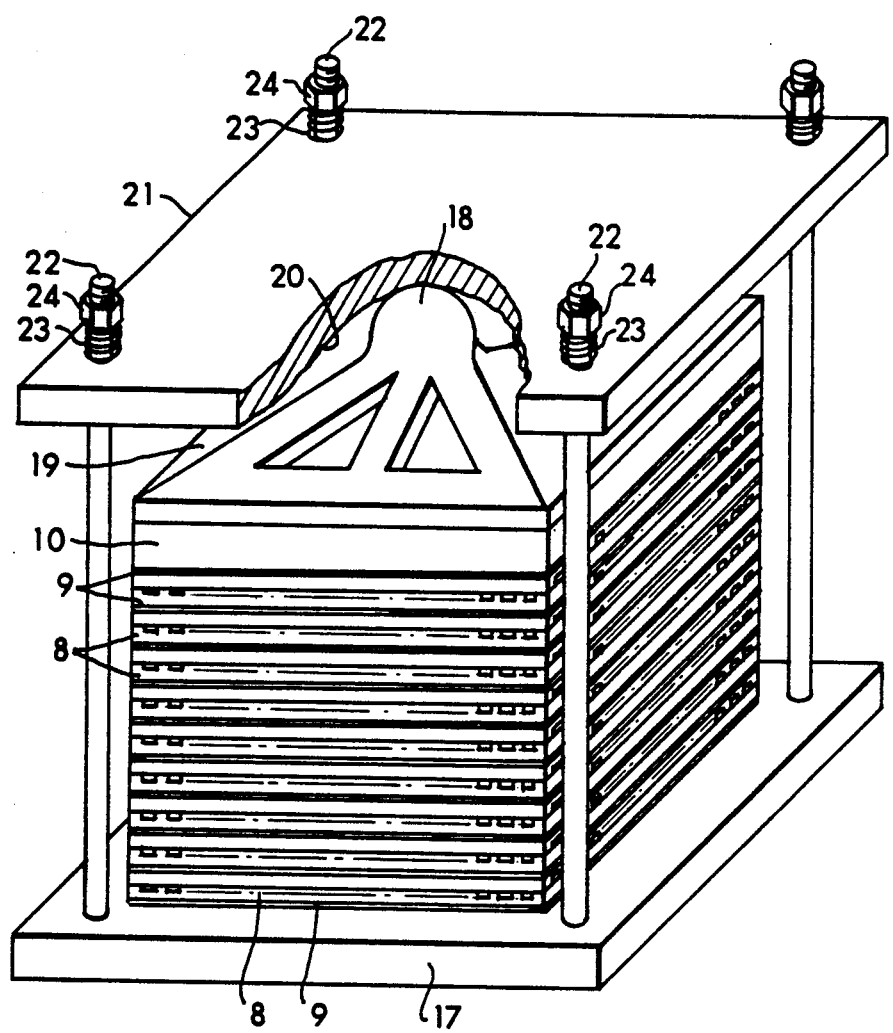
FIG. 3 is a partially sectional perspective view showing an example of a structure incorporating a fuel cell according to the present invention.

One preferred example of a structure incorporating a fuel cell according to the present invention will now be described referring to FIG. 3.

Many cells 8, nine layers in this example, constituting a fuel cell, details of which are shown in FIG. 1, are fixed on a base plate 17 after alternately stacked with partition plates 9, on the upper central portion of which a hollow pyramidal pressing jig 19, having a spherical projection 18, is placed. A fastening member 21, which may be a plate or crossed bars having at its lower central portion a rounded concave 20 of which a radius of curvature is larger than that of the spherical projection 18, is engaged with the spherical projection 18 of the pressing jig 19 at the rounded convave 20. The stacked cells 8 are fastened by means of bolts 22 and nuts 24 at the four corners of the fastening member 21 and at the four corners of the base plate 17, the nuts 24 screwed to the bolts 22 through a pressing spring 23 placed between the nuts and the upper surface of the fastening member 21.

In the thus constructed structure incorporating the fuel cell of this example, even if the fastening torques of the bolts 22 and the nuts 24 at the four corners fastening the fastening plate 21 differ from each other, the entire fastening force of the fastening member 21 is concentrated to the press jig 19 through the rounded projection 18 at the central upper portion thereof. Therefore, the entire surface of the cells of the pile layers is pressed by the pressing jig 19 with uniform surface pressure so that any unevenness can be diminished. Even if the bolts 22 are expanded due to a temperature rise, the cells 8 are not loosened because the pressing jig 19 is pressed by means of pressing springs 23.

Accordingly, the air-tightness of the fuel (hydrogen) passages 4 and of the air (oxygen) passages 6 of the cells 8 is never damaged, and the output is not lowered because the contact resistance does not increase.

Although the present invention has been described in its preferred embodiment with reference to the annexed drawings, it is readily understood that the present invention is not restricted to the said embodiment, and various changes and modifications may be made in the present invention by those skilled in the art without departing from the scope of the present invention.

What is claimed is:

1. A structure for incorporating a fuel cell comprising a plurality of layers of cells which constitute a fuel cell and are elastically piled between a fastening member and a base plate, the substantially entire surface of at least one of the end layers being pressed by the surface of a pressing jig which is rotatably engaged with the surface of the fastening member, whereby forces from said fastening means are transmitted to said pressing jig through the rotatable contact therebetween.

2. A structure for incorporating a fuel cell comprising a plurality of layers of unit cells which constitute a fuel cell and are alternately piled with partition plates placed on a base plate; a pressing jig placed on the piled layers having a spherical projection on the upper central portion; and a fastening member having at its lower central portion a rounded concave engaged with the spherical projection of the pressing jig; the piled cells being fastened by means of bolts and nuts at the four corners of the fastening member and at the four corners of the base plate, and the nuts screwed to the bolts through pressing springs placed between the nuts and the upper surface of the fastening member.

* * * * *